United States Patent
Biro et al.

(10) Patent No.: US 9,987,976 B1
(45) Date of Patent: Jun. 5, 2018

(54) FOLDABLE WARNING DEVICE HAVING A PLURALITY OF INDICATIONS

(71) Applicants: Walter Biro, Boca Raton, FL (US); Sean Biro, Boca Raton, FL (US)

(72) Inventors: Walter Biro, Boca Raton, FL (US); Sean Biro, Boca Raton, FL (US)

( * ) Notice: Subject to any disclaimer, the term of this patent is extended or adjusted under 35 U.S.C. 154(b) by 35 days.

(21) Appl. No.: 14/849,526

(22) Filed: Sep. 9, 2015

(51) Int. Cl.
*B60Q 7/00* (2006.01)
*B60Q 1/46* (2006.01)
*G09F 9/40* (2006.01)
*G09F 13/00* (2006.01)

(52) U.S. Cl.
CPC ............... *B60Q 1/46* (2013.01); *G09F 9/40* (2013.01); *G09F 13/005* (2013.01)

(58) Field of Classification Search
CPC .......... B60Q 1/46; B60Q 1/26; B60Q 1/4603; B60Q 1/4607; G09F 9/40; G09F 13/005; G09F 13/00
See application file for complete search history.

(56) References Cited

U.S. PATENT DOCUMENTS 4,447,802 A * 5/1984 Bose .................. B60Q 7/00
116/63 P \* cited by examiner

*Primary Examiner* — Hongmin Fan
(74) *Attorney, Agent, or Firm* — Ronald V. Davidge

(57) ABSTRACT

A foldable warning device includes a number of illuminated display elements attached to one another to move along a flat plane, a number of permanent magnets for the attachment of the display to a vehicle, and a support illuminated element that can be moved from a position extending along the flat plane to a position extending away from the flat plane to support the device on a road surface, Alternately, the device may be attached to extend outward from a window on either side of the vehicle.

15 Claims, 7 Drawing Sheets

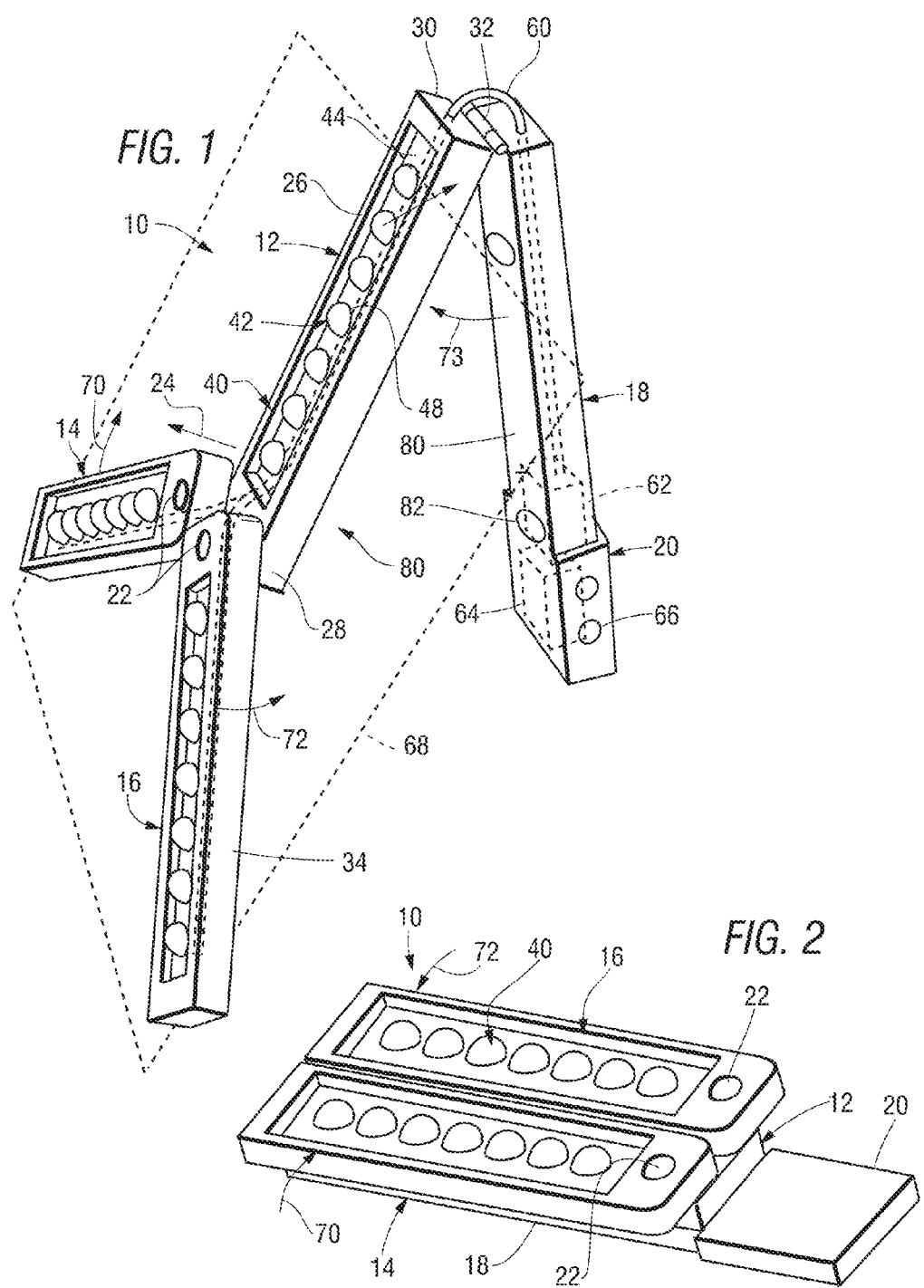

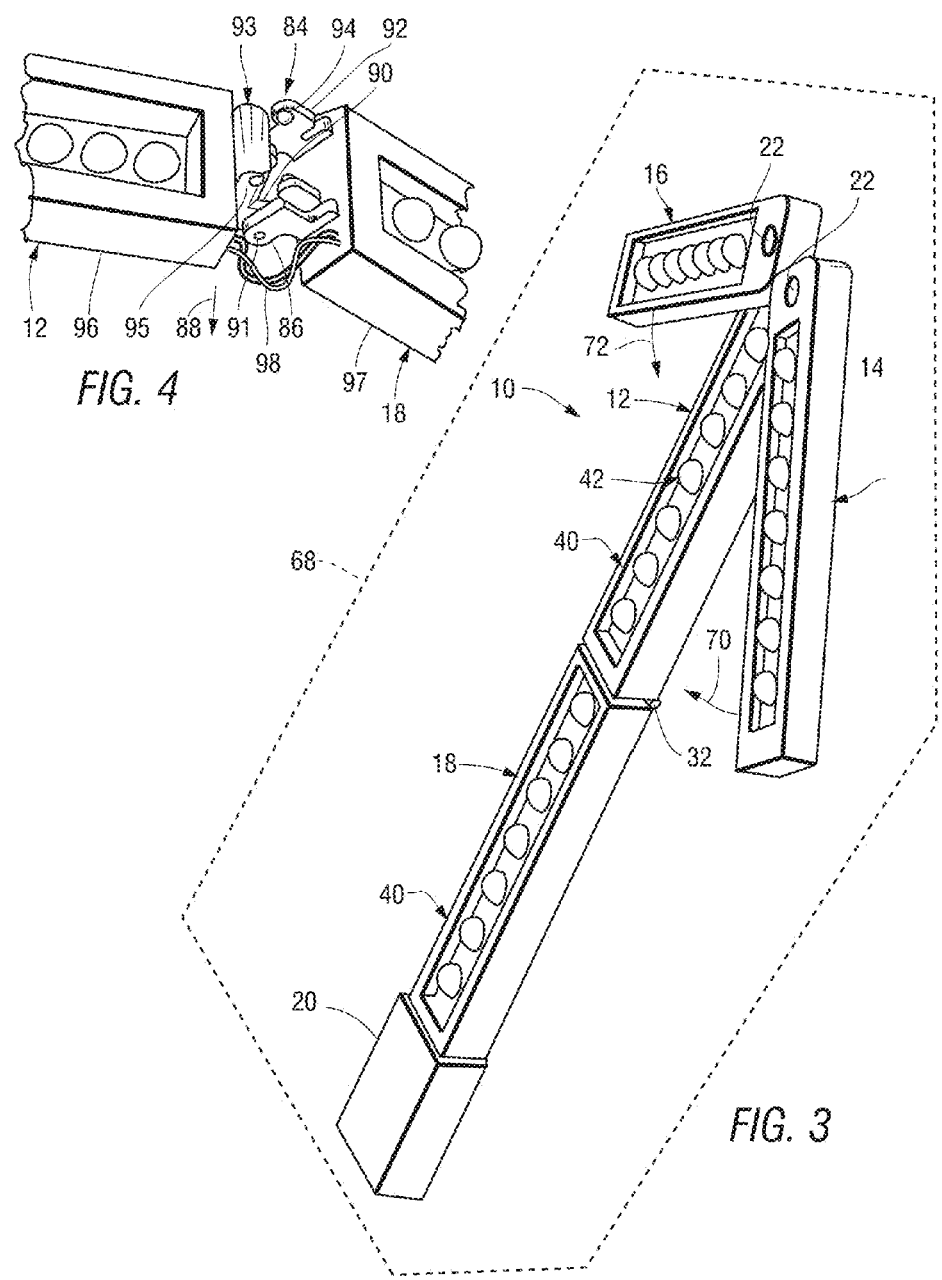

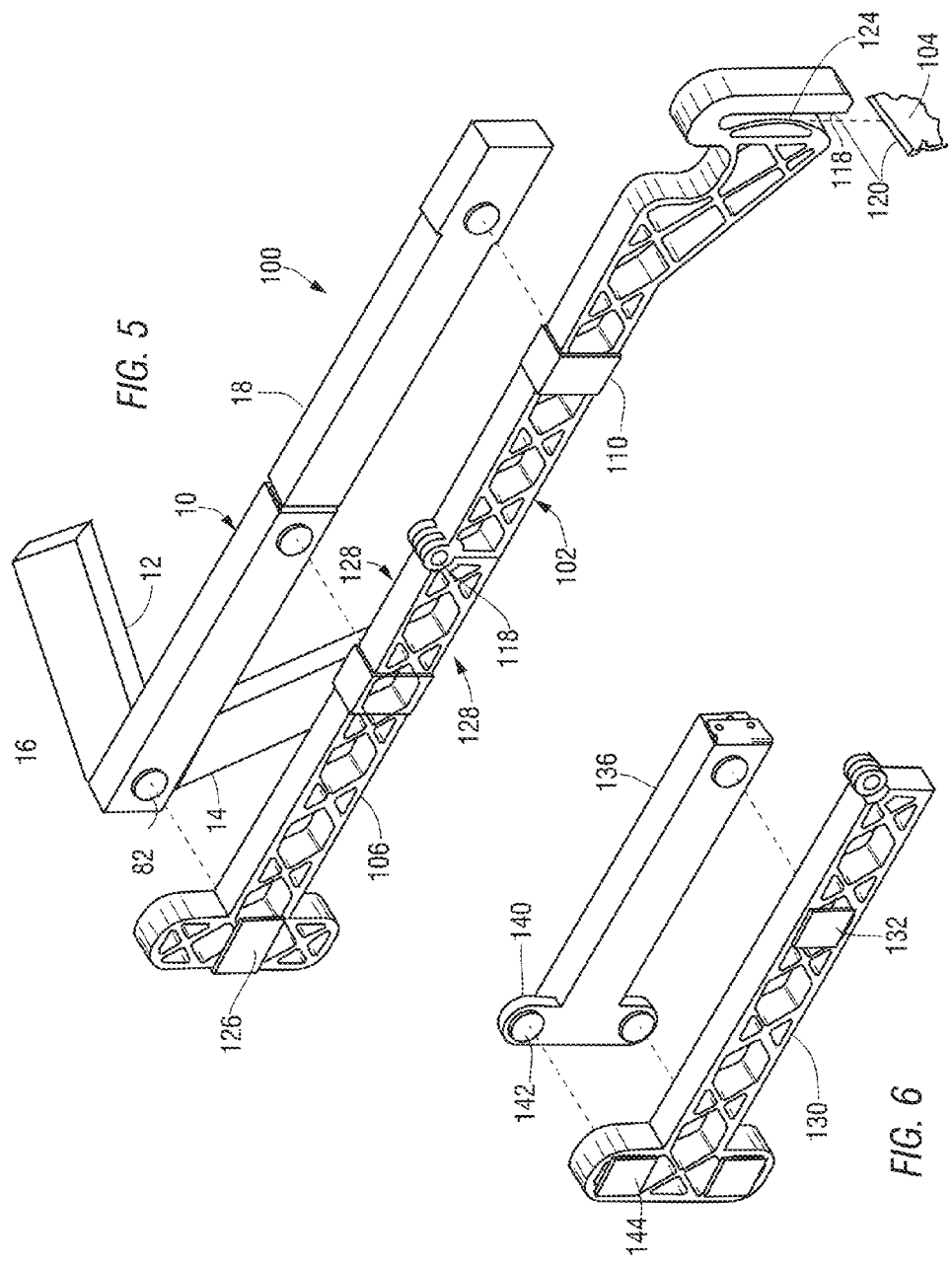

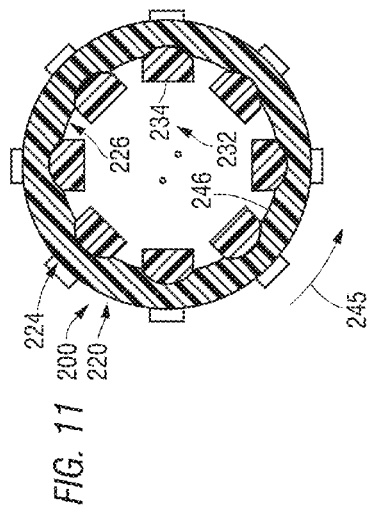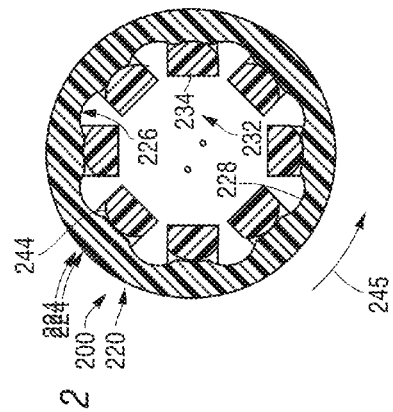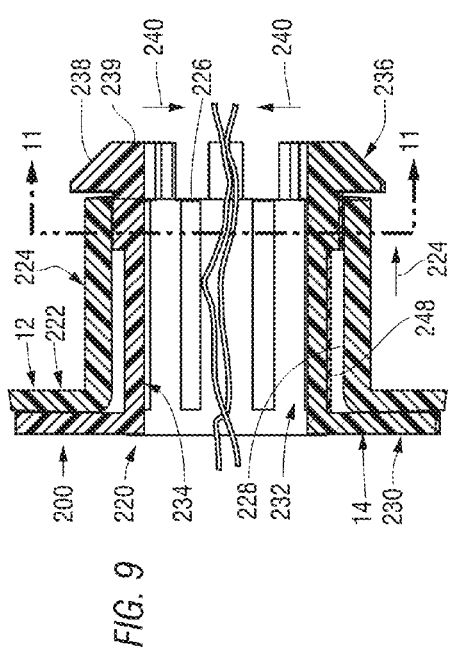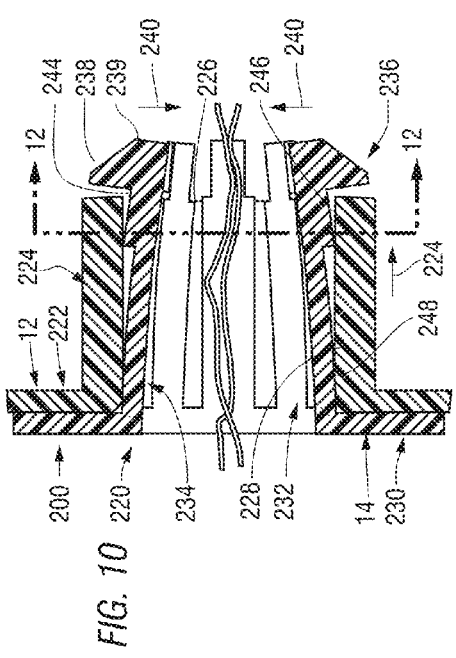

FOLDABLE WARNING DEVICE HAVING A PLURALITY OF INDICATIONS

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to a device for warning approaching motorists of a road hazard.

2. Summary of the Background Information

Many serious traffic accidents occur when motorists approach a stopped vehicle from behind while assuming that it is moving forward. Motorists have become accustomed to being warned to go around road hazards by a flashing illuminated arrow indicating the direction that a lane change must be made to avoid the hazard. For example, flashing arrows formed on large signs mounted on trailers and other construction vehicles deployed at construction sites to route motorists around hazards. Some emergency vehicles are also equipped with flashing arrows to be used in this way at accident sites. Motorists are additionally accustomed to changing lanes in response to orange cones, flares, or barrels placed in the roadway in front of a road hazard.

Since it is often illegal or undesirable, because of a need to preserve evidence of how an accident occurred, to move a vehicle from an accident site, and because it is often desirable for injured individuals to remain within a vehicle involved in a collision until they can be carefully removed by emergency personnel, effective devices are needed to warn approaching motorists of the presence of a disabled vehicle. Furthermore, since it is well known that many individuals have survived automobile accidents only to be killed by passing vehicles after leaving their vehicle, a foldable warning device that can be installed by an individual remaining within the vehicle is needed. Since hazardous conditions resulting from vehicular accidents assume many different forms, and since it is additionally desirable to warn approaching motorists of a vehicle stopped due to a mechanical breakdown, it is desirable that such foldable warning devices be flexible in their configuration and in the ways that they can be installed and supported.

SUMMARY OF THE INVENTION

In accordance with one aspect of the invention, apparatus including a plurality of illuminated display elements, a support illuminated display element, an electrical circuit, and a plurality of permanent magnets is provided. The illuminated display elements within the plurality are attached to one another to be individually movable along a flat plane, the support illuminated display element is attached to an illuminated display element within the plurality to be moved between a position extending along the flat plane to a position extending inwardly, away from the flat plane. The support illuminated display element and each of the illuminated display elements within the plurality include a light source assembly. The electrical circuit, which includes at least one battery, causes each light source assembly to illuminate. The permanent magnets are attached to one or more of the illuminated display elements, facing inward.

With the support illuminated display element extending along a flat plane, the apparatus can be placed on a rear surface of a disabled vehicle, to be held in place by the permanent magnets, for example with the illuminated display elements, including the support illuminated display element, being arranged in the shape of an arrow indicating a path approaching vehicles should take around the disabled vehicle. With the support illuminated display element being pivotally attached to the first illuminated display element, a detent mechanism may be arranged to hold these elements in a flattened condition, I.e. in line with one another. With the support illuminated display element in a position extending inwardly away from the plane, the apparatus can be placed on the roadway, with the illuminated display elements in the being arranged to form a symbol warning oncoming motorists of the presence of the disabled vehicle.

For example, the plurality of illuminated display elements includes a first illuminated display element, having a first end flexibly attached to the illuminated support member, and second and third illuminated display elements, each pivotally attached to a second end of the first illuminated display element, opposite the first end. The electrical circuit includes first, second, third, and fourth circuit portions, held within the first, second, third, and support illuminated display elements, respectively. The support illuminated display element may be attached to the first illuminated display element by a hinge, with the fourth circuit portion being connected to the first circuit by wires sliding within one or more holes in the illuminated display elements, or by wires flexing between the illuminated support elements. Alternately, the support illuminated support element may be connected to the first illuminated support element by an elastomeric block, with wires extending through the elastomeric block between the fourth and first circuit portions.

Preferably, each light source assembly includes a circuit board assembly, a reflector, and a transparent cover. The circuit board assembly includes a plurality of light emitting devices disposed along a line. The reflector includes an outward facing reflective surface and a plurality of holes aligned with the light emitting devices. The transparent cover includes a plurality of lens structures aligned with the light emitting devices to modify the light emitted by these devices.

In accordance with another aspect of the invention, apparatus comprising first and second display elements, a bearing member, and a latch array is provided. The bearing member extends outward from the first display element to an end surface and has an internal surface including a circular array of equally spaced detent notches. The latch array includes a circular array of flexible members extending inward from the second display member. Each of the flexible members includes a proximal bearing surface configured to slide along the internal surface of the bearing member with rotation of the second display element, a distal latching tooth, extending radially outward adjacent to the end surface of the bearing member, and a rounded detent surface adjacent to the latching tooth, extending radially outward in engagement with one of the detent notches in the bearing member. An application of sufficient torque between the first and second display elements causes each of the rounded detent surfaces to move radially inward, through flexure of the flexible member and to move to a next detent slot.

In accordance with yet another aspect of the invention, apparatus for displaying a warning from either side of a vehicle is provided. The apparatus comprises a display element, displaying an arrow, and an attachment section, including a first attachment slot configured for attaching the apparatus to a window of a vehicle with the arrow pointing away from the vehicle. In one version of the apparatus, the attachment section comprises a support arm, including the first attachment slot, one or more ferromagnetic structures, and first and second sides, opposite one another, while the display element includes a number of permanent magnets configured for attaching the display element to either side of the support arm. In another version of the apparatus,

BRIEF DESCRIPTION OF THE FIGURES

These and other aspects of the invention will be made apparent by reading the following specification in conjunction with the accompanying drawings, in which:

FIG. 1 is a perspective view of a foldable warning device built in accordance with a first embodiment of the invention, shown in an inverted "Y" configuration for display on a roadway;

FIG. 2 is a perspective view of the foldable warning device of FIG. 1, shown as configured for storage or for use as a flashlight;

FIG. 3 is a perspective view of the foldable warning device of FIG. 1, shown in an arrow configuration for attachment to a vehicle surface;

FIG. 4 is a fragmentary perspective view of the foldable warning device of FIG. 1, showing alternative electrical and mechanical connections between illuminated display elements therein;

FIG. 5 is a perspective view of a warning system built in accordance with a second embodiment of the invention, including a support arm, shown in an exploded relationship with the foldable warning device of FIG. 1 and with an upper edge portion a vehicle window;

FIG. 6 is a fragmentary perspective view of an alternate version of the warning system of FIG. 4;

FIG. 9 is a fragmentary transverse cross-sectional elevation of the foldable warning device of FIG. 7, taken as indicated by section lines 9-9 in FIG. 8 to show the pivotal attachment of an illuminated display element in a preferred position therein;

FIG. 10 is a fragmentary transverse cross-sectional elevation of the foldable warning device of FIG. 7, taken as indicated by section lines 10-10 in FIG. 8 to show the pivotal attachment of an illuminated display element between preferred positions therein;

FIG. 11 is a fragmentary longitudinal cross-sectional elevation of the foldable warning device of FIG. 7, taken as indicated by section lines 11-11 in FIG. 9;

FIG. 12 is a fragmentary longitudinal cross-sectional elevation of the foldable warning device of FIG. 7, taken as indicated by section lines 10-10 therein;

DETAILED DESCRIPTION OF THE INVENTION

Figure 7:
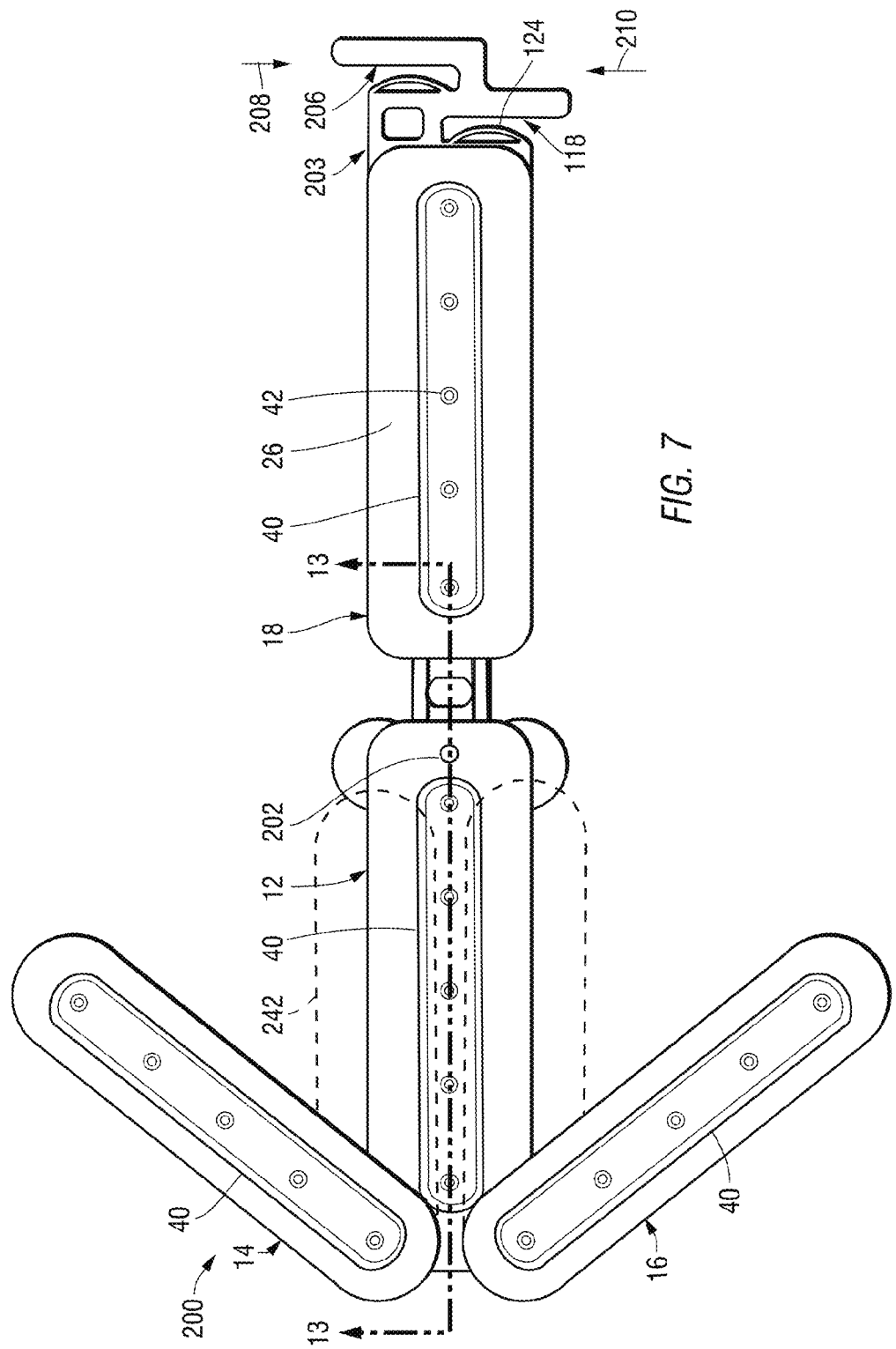
FIG. 7 is a front elevation of a foldable warning device built in accordance with a third embodiment of the invention, shown in an arrow configuration.

FIG. 1 is a perspective view of a foldable warning device 10 built in accordance with a first embodiment of the invention to include a first illuminated display element 12, a second illuminated display element 14, a third illuminated display element 16, and a support illuminated display element 18 including a handle 20. The second and third illuminated display elements 14, 16 are pivotally attached to the first illuminated display element 12 by pins 22 extending outward in the direction of arrow 24, perpendicular to the front surface 26 of the first illuminated display element 12 at an outwardly disposed end 28 of the first illuminated display element 12. An inwardly disposed end 30 of the first illumination display element 12 is attached to a first end 31 of the support illuminated display element 18 by a hinge 32. Housings 34 of the illuminated display elements 12, 14, 16, 18, including the front surfaces 26, are preferably brightly colored and/or reflective.

The front surface 26 of each of the illuminated display elements 12, 14, 16 includes an illuminated member 40 comprising, for example, a plurality of lighting elements 42 held within a reflective tray 44. For example, each of the lighting elements 42 may comprise a light emitting diode 46 within a thermoplastic lens 48, with the lighting elements 42 being configured to produce white light or a light having a color, such as orange, yellow, or red, commonly associated with hazardous conditions. The lighting elements 42 are connected to a flexible circuit 60 extending within and between the illuminated display elements 12, 14, 16 and within the support member 18 to a control circuit 62 powered by a battery 64 in response to the manual operation of input devices 66. The flexible circuit 60, which may include flexible wires or flexible printed circuits, may slide through openings 67 between adjacent elements pr may be extend within flexible hinge materials. The lighting elements may be turned on for continuous operation or for flashing, either simultaneously or sequentially. For example, the foldable warning device 10 can be changed from the inverted "Y" configuration of FIG. 1 to an inverted "T" configuration by pivoting the second and third illuminated display elements 14, 16 in the directions of arrows 70, 72, respectively.

It is noted that the first, second, and third illuminated display elements 12, 14, 16, being pivotally connected to one another, are movable along a flat plane, indicated by dashed lines 68, to form various displayed symbols, which are displayed in an outward direction, indicated by arrow 24. In the example of FIG. 1, the support illuminated display element 18 is moved away from the plane 68, in an inward direction, opposite the direction of arrow 24, to provide a stable support on a road surface (not shown).

FIG. 2 is a perspective view of the foldable warning device 10, shown as configured for storage or for use as a flashlight. The foldable warning device 10 is moved from the configuration of FIG. 1 to the configuration of FIG. 2 by pivoting the second and third illuminated display elements 14, 16 about the pivot pins 22 in the direction of arrows 70, 72, respectively, and by pivoting the support member 12 inwardly about the hinge 32, in the direction of arrow 73, so that the second and third illuminated display elements 14, 16 extend adjacent on another along the first illuminated display element 12. The foldable warning device 10 is moved from the configuration of FIG. 2 to that of FIG. 1 by reversing this process. For example, the foldable warning device 10 is carried by the handle 20 for use as a flashlight, with illumination being provided by the illuminated members 40 within the second and third display elements 14, 16.

FIG. 3 is a perspective view of the foldable warning device 10, shown in an arrow configuration for attachment to a vehicle surface. The foldable warning device 10 is moved from the configuration of FIG. 1 to the configuration of FIG. 3 by pivoting the second and third illuminated display elements 14, 16 about the pivot pins 22, opposite the directions of arrows 70, 72, respectively. Preferably, the support member 18 additionally includes a support illuminated member 40 on a front surface 76. For example, the second and third illuminated display elements 14, 16 may be changed so that various orientations of "Y," "J," and "L" can be displayed.

Referring again to FIG. 1, reverse surfaces 80 of the first illuminated display element s12 and of the support member 18 preferably include a number of magnets 82 that are used to hold the foldable warning device 10 in place on a stopped vehicle surface, with the foldable warning device 10 being placed to extend horizontally, indicating the direction an approaching vehicle should take to pass the stopped vehicle.

In the example of FIG. 3, the support illuminated display element 18 extends along the flat plane indicated by dashed lines 68, elongating the displayed arrow and flattening the foldable warning display 10 for attachment to a vehicle surface with the permanent magnets 82.

FIG. 4 is a fragmentary perspective view of the foldable warning device 10, showing alternative electrical and mechanical connections between the first illuminated display element 12 and the support illuminated display element 18, including an alternative hinge configuration 84 including detent means for releasably holding the first illuminated display element 12 and the support illuminated display element 18 in the flattened condition shown in FIG. 3. The alternative hinge configuration 84 includes a pair of outer hinge brackets 86, separated from one another in the transverse direction of arrow 88, each engaging an inner bracket 90 with a pin 91, and a pair of detent brackets 92 releasably engaging an inner detent structure 93, with a pair of rounded detent members 94 of the detent brackets 92 engaging a detent hole 95 within the inner detent structure 93 to hold the first illuminated display element 12 and the support illuminated display element 18 in the flattened condition shown in FIG. 3. The inner detent structure 93 includes a beveled surface 96 to facilitate entry of the rounded detent members 94 into the detent hole 95. For example, the detent brackets 92 are sufficiently flexible to allow forces manually applied to the first illuminated display element 12 and to the support illuminated display element 18 to move the rounded detent members 92 into and out of the detent hole 95.

For example, the first illuminated display element 12 includes an outer housing member 96, the inner detent structure 93, and the inner brackets 90 and the pins 91, all of which are formed as an integral molded thermoplastic part. For example, the support illuminated display element 18 includes an outer housing member 97, the outer hinge brackets 86, and the detent brackets 92. FIG. 4 additionally shows the alternative use of wires 98 flexing with movement occurring between the first illuminated display element 12 and the support illuminated display element 18.

FIG. 5 is a perspective view of a foldable warning system 100 built in accordance with a second embodiment of the invention to include the foldable warning device 10, described above in reference to FIGS. 1-4, along with a support arm 102, which is provided to support the attachment of the foldable warning device to extend outward from a vehicle window 104, indicating that other vehicles should proceed around and past a disabled vehicle. The foldable warning device 10, having the illuminated display elements 12, 14, 16, and 18 moved into the arrow configuration described above in reference to FIG. 3, is removably attached to, and held in place on, the support arm 102 by a number of permanent magnets 82, which have been provided for the alternative attachment of the foldable warning device 10 to a ferromagnetic surface structure of a vehicle. In the figure, the support arm 102 is shown in an exploded relationship with the vehicle window 104.

For example, the support arm 102 includes a first elongated member 106 and a second elongated member 108, each composed of a thermoplastic resin, forming a truss structure to achieve a combination of lightness and stiffness, with ferromagnetic clips 110 being attached thereto in locations corresponding to locations of the permanent magnets 82 when the foldable warning device 10 is held in place against the support arm 102. The first and second elongated members are pivotally connected by a pin 112, allowing the first elongated member 106 to be rotated in the direction of arrow 114 until the upper surfaces 116 of the first and second elongated members 106, 108 lie against one another. In this way, the support arm 102 is folded for storage with the foldable warning device 10, being approximately the same length as the foldable warning device 10 it its folded condition, as shown in FIG. 2.

The support arm 102 additionally includes an attachment slot 118, configured to be placed over an upper edge 120 of a vehicle window 104, allowing the support arm 102 to be placed on either side of the vehicle, with the foldable warning device 10 attached thereto displaying an illuminated arrow pointing away from the vehicle. The attachment slot 118 includes a spring member 124 that is deflected to maintain engagement with the vehicle window 104 despite variations in the thickness of the glass therein and despite the presence or absence of a frame around the window 104. Preferably, each of the ferromagnetic clips 110 includes tabs 126 extending along both sides 128 of the support arm 102, so that the foldable warning device 10 can be attached to either side 128 to face oncoming traffic.

FIG. 6 is a fragmentary perspective view of an alternative warning system 130 built in accordance with an alternative version of the second embodiment of the invention. The figure shows the first elongated member 132 within an alternative support arm 134 in an exploded relationship with an alternative foldable warning device 136, having a first illuminated display element 138 with tabs 140 extending outward to hold permanent magnets 142 apart from one another. The alternative support arm 134 includes a number of ferromagnetic plates 144, attached to each side 146 thereof. This arrangement provides somewhat greater strength and stability for the attachment of the alternative foldable warning device 136 to the alternative support arm 134.

In either the support arm 102 or the alternative support arm 134, the ferromagnetic clips 110 or the ferromagnetic plates 144 may be located by recessed areas or by rib s (not shown). The support arm 102 and the alternative support arm 134 are otherwise similar, and their features, as described above, may be combined. For example, the ferromagnetic clips 110 of FIG. '4 may be placed in the locations of the ferromagnetic plates 144 shown in FIG. 5.

External features of a foldable warning device 200, built in accordance with a third embodiment of the invention will now be discussed, with reference being made to FIG. 7, a front elevation of the foldable warning device 200, and to FIG. 8, a rear elevation thereof. Like the foldable warning device 10, discussed above in reference to FIGS. 1-3, the foldable warning device 200 includes a first illumined display element 12, a second illuminated display element 14, and a third illuminated display element 16, with the second and third illuminated display elements 14, 16 each pivotally attached to the first illuminated display element 12, and a fourth illuminated display element 18, flexibly attached to the first illuminated display element 12. In addition, like the foldable warning device 10, each of the illuminated display elements 12, 14, 16, 18 of the foldable warning device 200 includes a front surface 26 having an illuminated member 40 with a number of lighting elements 42, while a reverse surface 80 of at least one of the illuminated display elements 12, 14, 16, 18 includes a number of permanent magnets 82 for holding the foldable warning device 200 in place on a stopped vehicle. In addition, the reverse surface 80 of one of the illuminated display elements 12, 14, 16, 18 includes a removable battery cover 201. A power switch button 202 extends through the front surface 26 of the first illuminated display element 12. The illuminated display elements 12, 14, 16, 18 can be moved into any of the configurations shown in FIGS. 1-3 and used as discussed above in reference thereto.

Like the warning system 100, described above in reference to FIG. 4, the foldable warning device 200 includes a slot 118 having a spring member 124, providing for attachment to an upper edge 120 of a vehicle window 104 (shown in FIG. 4). Within the foldable warning device 200, the slot 118 is formed within an attachment member 203 disposed at an outer end 204 of the support illuminated display member 18. The attachment member 203 additionally includes a second slot 206, extending into the attachment member 203 in a direction 208 opposite the direction 210 in which the slot 118 extends. Thus, the foldable warning device 200 can be placed to extend from either side of a vehicle, with two slots 118, 206 facilitating placement of the foldable warning device 200 so that its illuminated members 40 face oncoming traffic.

A pivotal mounting and detent mechanism 220 for attaching each of the second illuminated display element 14 and the third illuminated display element 16 to the first illuminated display element 12 will now be discussed, with reference being made to FIGS. 9-12. FIGS. 9 and 10 are fragmentary transverse cross-sectional elevations of the foldable warning device 200, taken as indicated by section lines 9-9 and 10-10, respectively in FIG. 8. FIG. 11 is a fragmentary cross-sectional longitudinal elevation thereof, taken as indicated by section lines 11-11 in FIG. 9. FIG. 12 is a fragmentary cross-sectional longitudinal elevation thereof, taken as indicated by section lines 12-12 in FIG. 10. The pivotal mounting and detent mechanism 220 is configured to stop and releasably hold one of the illuminated display elements 14, 13 at a number of preferred locations relative to the first illuminated display unit 12. For example, these preferred locations are separated by 45 degrees. FIGS. 9 and 11 show the pivotal mounting and detent mechanism 220 with the second illuminated display element 14 in one of the preferred positions, while FIGS. 10 and 12 show the pivotal mounting and display mechanism 220 with the second illuminated display element 14 mid-way between two of the preferred positions.

The first illuminated display member 12 includes an outer housing member 222 having a bearing member 224 extending inward, in the direction of arrow 224, to a distal bearing end 226. The bearing member 224 includes an internal surface 226 having a number of detent notches 228 that establish the preferred locations in which the second illuminated display member 14 is held. The second illuminated display member 14 includes an inner housing member 230 having a circular array 232 of flexible members 234 extending within the bearing member 224. The process of attaching the second illuminated display member to the first illuminated display member begins with moving the flexible members 234 in the inward direction of arrow 224 within the internal surface 226 of the bearing member 224. Each of the flexible members 234 includes a distal tooth 236 with an inclined surface 238 that deflects the distal end 239 of the flexible member 234 radially inward, in the direction of arrow 240. When the distal tooth 236 moves past the distal bearing end 226, the distal end 239 of the flexible member 234 returns radially outward, opposite the direction of arrow 240, so that the flexible member 234 is held within the bearing member 224.

The flexible member 234 additionally includes a rounded detent surface 244 adjacent the distal tooth 236. As the second illuminated display element 14 is rotated in or opposite the direction of arrow 245, the rounded detent surface 244 moves into and out of the detent notches 228, so that the second illuminated display element is held at each preferred location while additionally being removable therefrom, being movable along a bearing surface 246 extending between adjacent detent notches 228. Each of the flexible members 234 additionally includes a proximal bearings surface 248, which slides along the bearing surfaces 246 during pivoting movement of the second illuminated display member 14.

Figure 8:
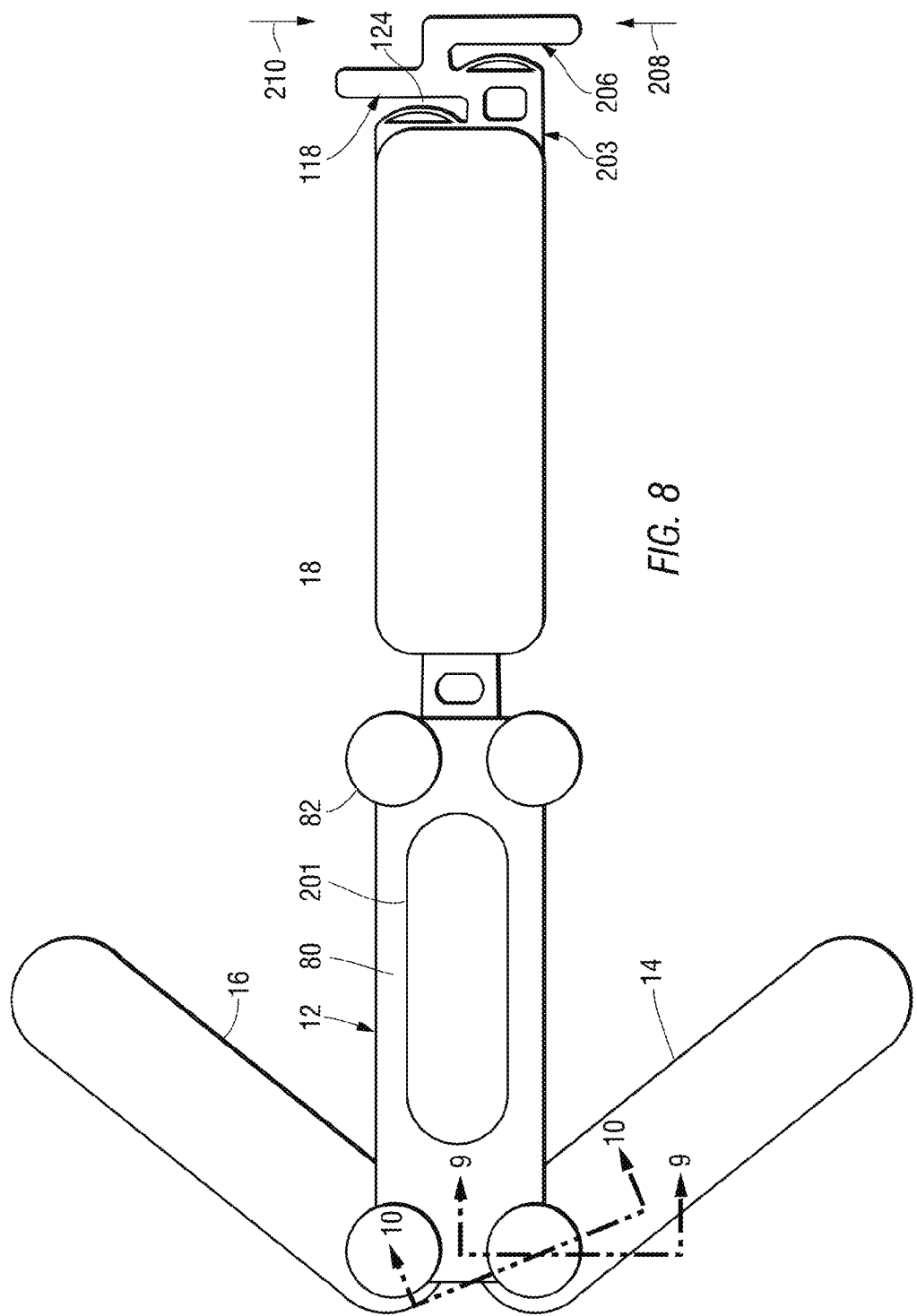
FIG. 8 is a rear elevation of the foldable warning device of FIG. 6.
Figure 13:
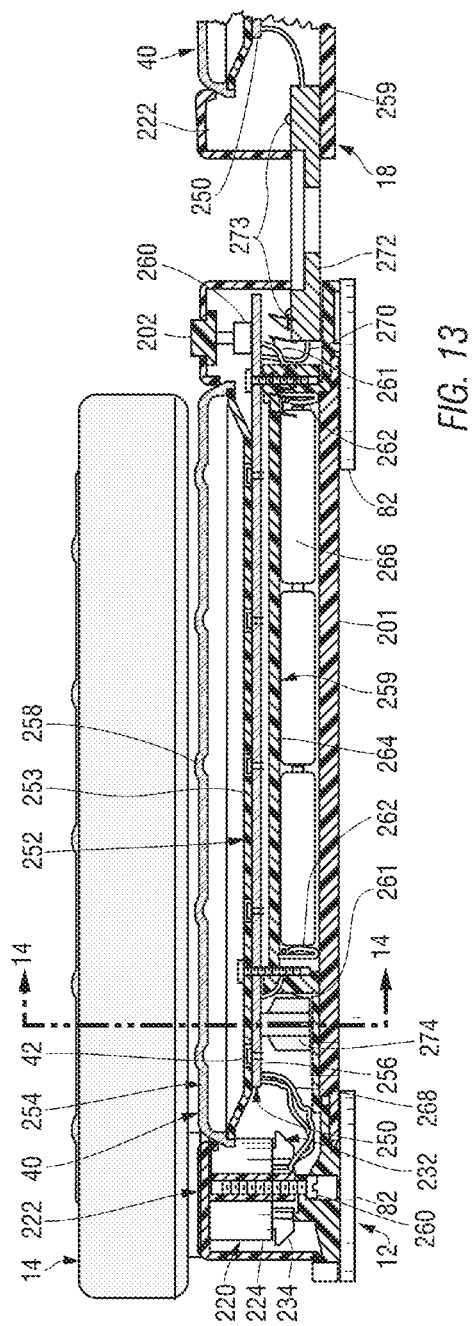
FIG. 13 is a fragmentary longitudinal cross-sectional elevation of the foldable warning device of FIG. 7, taken as indicated by section lines 13-13 therein.

FIG. 13 is a fragmentary longitudinal cross-sectional elevation of the foldable warning device 200, taken as indicated by section lines 13-13 in FIG. 7 to show the internal structure of the first illuminated display element 12, including an illuminated member 40. Each illuminated member 40 includes a circuit board assembly 250, a reflector 252, and a transparent cover 254. Each of the circuit board assemblies 250 includes a printed circuit board 256 and a number of lighting elements 42. Preferably, at least an outer surface 253 of the reflector 252 is coated with a reflective material to reflect light from the headlights of oncoming traffic. Preferably, the lighting elements 42 are each high-intensity LEDs (light emitting diodes). Preferably, the transparent cover 254 includes a lens structure 258 disposed adjacent each of the lighting elements 42 for modifying the light emitted from the lighting element 42.

The first illuminated display element 12 further includes an inner housing member 259 attached to the outer housing member 222 by a number of screws 260. The circuit board assembly 250 within the first illuminated display element 12 additionally includes a power switch 261, actuated by depressing the power switch button 202, and wires 261 electrically connected to contacts 262 within a battery holding structure 264, forming a portion of the inner housing member 259. Since the battery holding structure 264 is inwardly open, a battery cover 201 is provided to hold the batteries 266 in place, with this battery cover 201 being removable to allow battery replacement. The circuit board assembly 250 within the first illuminated display element 12 is additionally connected to circuit board assemblies 250 within the second and third illuminated display elements 14, 16 by wires 268 extending through the circular arrays 232 of flexible members 234, and to a circuit board assembly 250 within the support illuminated display element 18 by wires 270 extending through a flexible connecting member 272, which is, for example composed of an elastic resin molded over the wires 270. The flexible connecting member 272 is installed over pins 273 extending outward from the inner housing member 259 within each of the first illuminated display element 12 and the support illuminated display member 18, to be held in place by the attachment of the outer housing members 222 therein.

Figure 14:
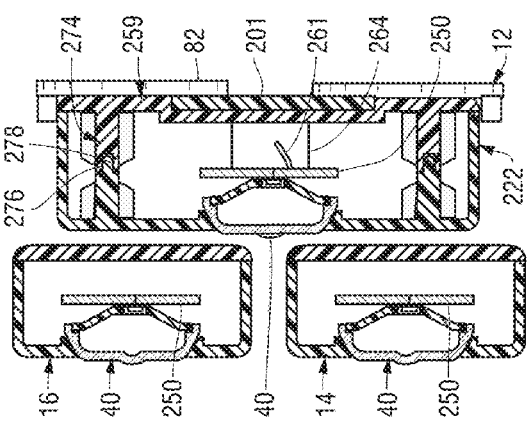
FIG. 14 is a fragmentary transverse cross-sectional elevation of the foldable warning device of FIG. 7, taken as indicated by section lines 14-14 in FIG. 13.

FIG. 14 is a tangential cross-sectional elevation of the foldable warning device 200, taken as indicated by section lines 14-14 in FIG. 13 to show alignment structures 274 used for aligning the outer and inner housing members 222, 259. Within each alignment structure 274, a pin 276 forming part of the upper housing member 226 is pushed into a hole 278 within the inner housing member 259 as these housing members 226, 232 are brought together. Preferably, additional examples of the alignment structure 274 are disposed at other locations (not shown) within the illuminated display elements 12, 14, 16, 18.

Devices, built in accordance with the invention have an advantage if providing a number of different configurations that can be placed on a rear surface of a disabled vehicle, on a side window to extend outward from a disabled vehicle, or on a road surface. This kind of flexibility provides significant advantages because of the many different conditions that can be established during a vehicular accident.

While the invention has been described in terms of preferred embodiments with some degree of particularity, it is understood that this description has been given only by way of example, and that many changes can be made without departing from the spirit and scope of the invention, as defined in the appended claims.

What is claimed is:

1. Apparatus comprising:
A first plurality of illuminated display elements, movably attached to one another to be individually movable along a flat plane, wherein each of the illuminated display elements in the first plurality of illuminated display elements includes a light source assembly, facing outward;
a support illuminated display element, flexibly attached to an illuminated display element within the plurality, movable between a position extending along the flat plane and a position extending inwardly away from the flat plane, wherein the support illuminated display element includes a light source assembly, facing outward, with the support illuminated display element in the position extending along the flat plane;
an electrical circuit, including at least one battery, causing each light source assembly to illuminate; and
a plurality of permanent magnets, attached to one or more of the illuminated display elements, facing inward.

2. The apparatus of claim 1, wherein the plurality of illuminated display elements includes:
a first illuminated display element having a first end flexibly attached to the support illuminated display member, and
second and third illuminated display elements, each pivotally attached to second end, opposite the first end, of the first illuminated display element.

3. The apparatus of claim 2, wherein each of the second and third illuminated display elements is pivotally attached to the first illuminated display element by attachments comprising:

a bearing member extending inward within the first illuminated display element to an end surface, having an internal surface including a circular array of evenly spaced detent notches;
a circular array of flexible members extending inward from the second or third illuminated display element within the internal surface of the bearing member, wherein each of the flexible members includes a proximal bearing surface configured to slide along the internal surface of the bearing member, a distal latching tooth extending radially outward adjacent the end surface of the bearing member, and a rounded detent surface adjacent the latching tooth, extending radially outward in engagement with one of the detent notches in the bearing member, wherein an application of sufficient torque between the first illuminated display element and the second or third illuminated display element causes each rounded detent surface to move radially inward through flexure of the flexible member, circumferentially to another detent notch, and then radially outward.

4. The apparatus of claim 3, wherein there are eight detent notches in each bearing member.

5. The apparatus of claim 3, wherein the electrical circuit comprises:
a first circuit portion within the first illuminated display element;
a second circuit portion within the second illuminated display element, connected to first circuit portion by a plurality of flexible wires extending through the latch array extending outward from the second illuminated display element; and
a third circuit portion within the third illuminated display element, connected to first circuit portion by a plurality of flexible wires extending through the latch array extending outward from the third illuminated display element.

6. The apparatus of claim 2, wherein the first, second, third, and support illuminated display elements can be configured to display an arrow.

7. The apparatus of claim 6, additionally comprising a first attachment slot for attaching the apparatus to a window of a vehicle, with the apparatus displaying an arrow pointing away from the vehicle.

8. The apparatus of claim 7, wherein
the apparatus additionally comprises a support arm including the attachment slot, one or more ferromagnetic structures, a first side, and a second side, opposite the first side,
the illuminated display elements are attached to the support arm by the permanent magnets, attracted to the one or more ferromagnetic structures within the support arm.

9. The apparatus of claim 8, wherein the support arm additionally comprises two elongated sections, pivotally attached to one another.

10. The apparatus of claim 7, wherein the support illuminated display element additionally comprises an attachment section including the first attachment slot, extending into the attachment section from a first edge of the attachment section and a second attachment slot, extending into the attachment section from a second edge, opposite the first edge.

11. The apparatus of claim 2, wherein
The support illuminated display element is pivotally connected to an illuminated display element in the first plurality of illuminated display elements, and the apparatus additionally comprises a detent mechanism moving a rounded surface into a notch to releasably hold the support illuminated display element and a flattened condition.

12. The apparatus of claim 1, wherein the electrical circuit composes a first circuit portion within the first illuminated display element and a fourth circuit portion within the support illuminated display element, electrically connected to the first circuit portion by flexible wires sliding within one or more openings within the illuminated display elements.

13. The apparatus of claim 1, wherein the electrical circuit composes a first circuit portion within the first illuminated display element and a fourth circuit portion within the support illuminated display member, electrically connected to the first circuit portion by flexible wires flexing between the illuminated display elements.

14. The apparatus of claim 1, wherein;
the support illuminated display element is connected to an illuminated display element in the first plurality of illuminated display elements by an elastomeric block, and
the electrical circuit composes a first circuit portion within the first illuminated display element and a fourth circuit portion within the support illuminated display element, electrically connected to the first circuit portion by flexible wires sliding within one or more openings within the illuminated display elements.

15. The apparatus of claim 1, wherein each light source assembly comprises:
a circuit board assembly including a plurality of light emitting devices exposed along a line;
a reflector including an outward facing reflective and a plurality of holes, disposed at locations of the light emitting devices, and
a transparent cover of disposed from the reflector, including a lens structure aligned with each of the light emitting devices to modify a pattern of light emitted by the light emitting device.

* * * * *